US011120774B1

(12) United States Patent
Halliday

(10) Patent No.: US 11,120,774 B1
(45) Date of Patent: Sep. 14, 2021

(54) SUBPIXEL TEXT RENDERING

(71) Applicant: Electronic Arts Inc., Redwood City, CA (US)

(72) Inventor: Matthew Sean Halliday, Coquitlam (CA)

(73) Assignee: Electronic Arts Inc., Redwood City, CA (US)

(*) Notice: Subject to any disclaimer, the term of this patent is extended or adjusted under 35 U.S.C. 154(b) by 0 days.

(21) Appl. No.: 16/992,374

(22) Filed: Aug. 13, 2020

(51) Int. Cl.
*G09G 5/30* (2006.01)
*G09G 5/32* (2006.01)
*G06T 11/00* (2006.01)
*G06T 11/20* (2006.01)

(52) U.S. Cl.
CPC .............. *G09G 5/30* (2013.01); *G06T 11/001* (2013.01); *G06T 11/203* (2013.01); *G09G 5/32* (2013.01)

(58) Field of Classification Search
CPC combination set(s) only.
See application file for complete search history.

(56) References Cited

U.S. PATENT DOCUMENTS

| 8,488,434 B2* | 7/2013 | Ito | G11B 7/1374 369/112.23 |
| 2013/0002678 A1* | 1/2013 | Cornell | G06T 11/203 345/467 |
| 2014/0320527 A1* | 10/2014 | Cohen | G06T 11/203 345/629 |
| 2020/0134902 A1* | 4/2020 | Seiler | G06T 11/001 |

* cited by examiner

*Primary Examiner* — Wesner Sajous
(74) *Attorney, Agent, or Firm* — Lee & Hayes, P.C.

(57) ABSTRACT

A system may render glyphs based on stored textures without loss of quality at subpixel scales. The system may determine a content of a pixel of a display corresponds to a glyph, determine a subpixel alignment offset of a specified screen coordinates for the glyph with respect to the pixels of the display, based on the subpixel alignment offset, select one or more versions of the glyph from a plurality of versions of the glyph, a first version of the glyph of the plurality of versions of the glyph having a corresponding first subpixel alignment offset and a second version of the glyph of the plurality of versions of the glyph having a corresponding second subpixel alignment offset, and generate a display version of the pixel based on the selected one or more versions of the glyph and the subpixel alignment offset of the specified screen coordinates.

20 Claims, 7 Drawing Sheets

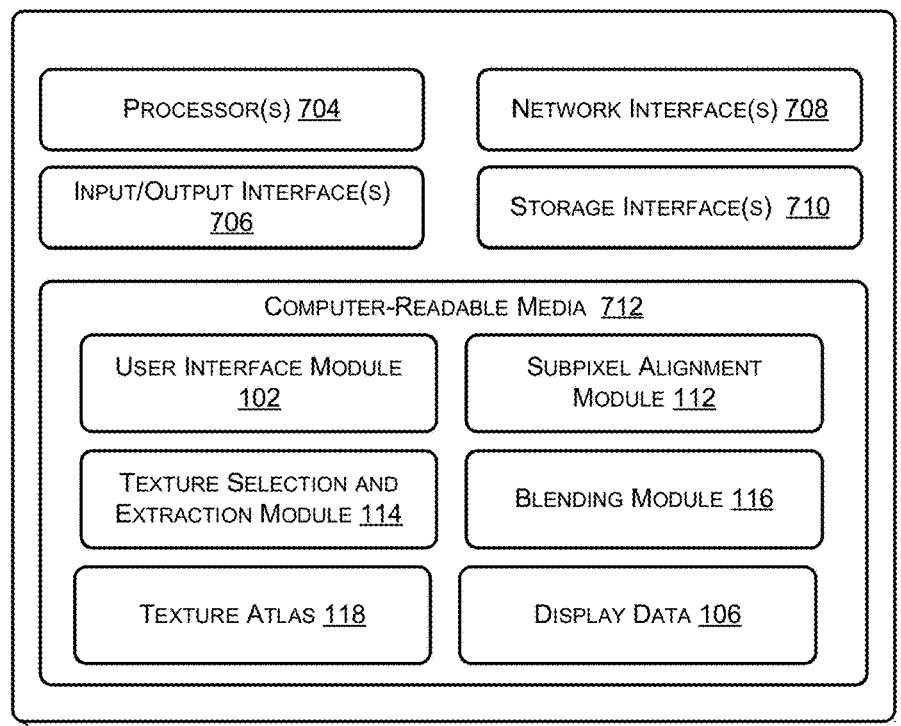
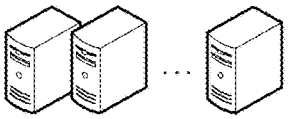
FIG. 7

SUBPIXEL TEXT RENDERING

BACKGROUND

In text rendering, glyphs (e.g., characters) may be rendered by reusing a texture of the glyph, for example included in a texture atlas. However, when using the same texture, differences between glyphs on the display may be noticeable due to different pixel alignments, especially when displaying glyphs near the pixel scale.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 7 illustrates a block diagram of an example system including one or more computing device(s) that may determine a subpixel alignment offset for a glyph to be displayed and, based on the subpixel alignment offset, select one or more versions of the glyph for use in displaying the glyph, in accordance with example embodiments of the disclosure.

DETAILED DESCRIPTION

Figure 1:
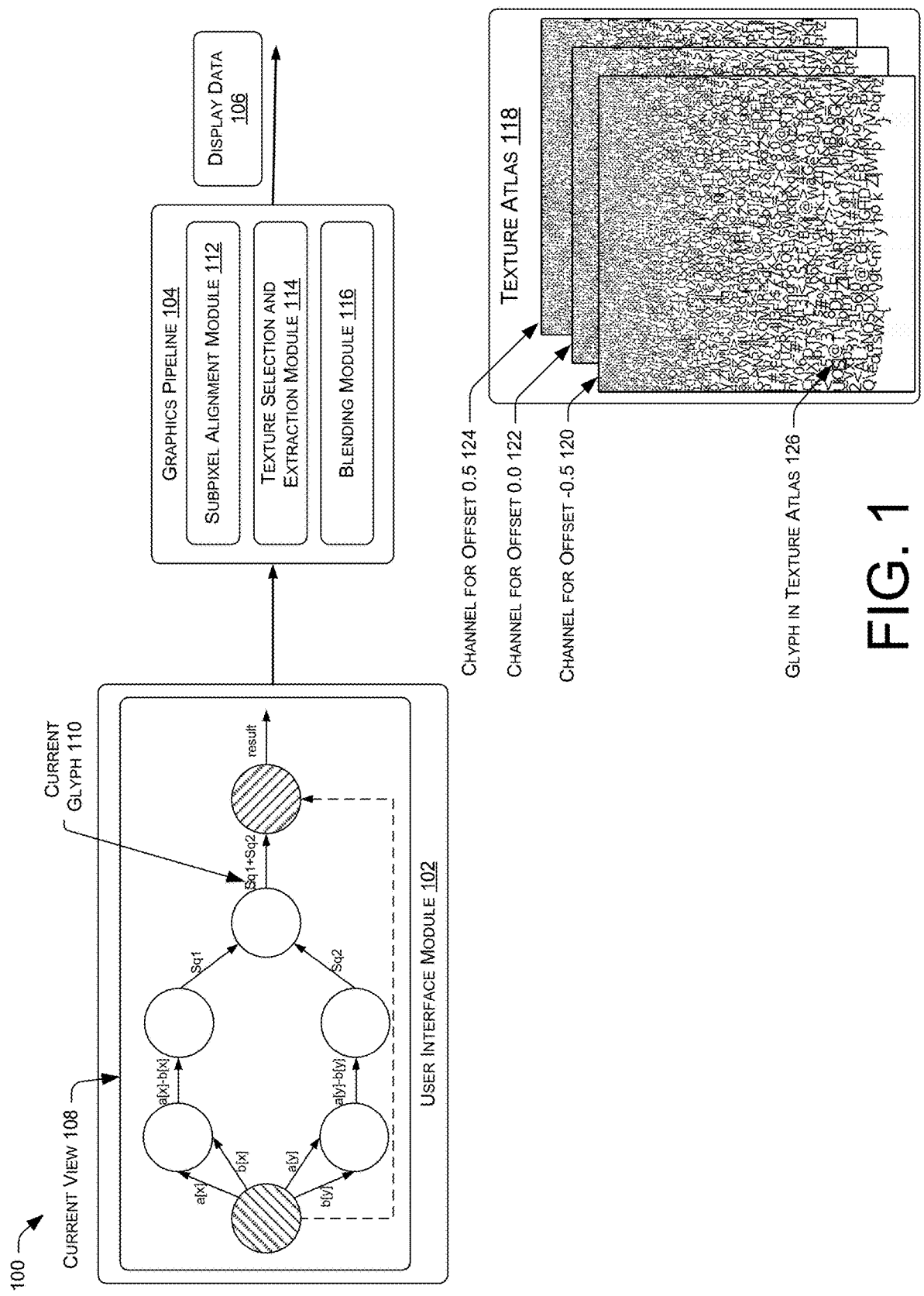
FIG. 1 illustrates a schematic diagram of an example system including a user interface module and a graphics pipeline that may render glyphs based on stored textures (e.g., texture atlas or texture cache) without loss of quality at subpixel scales, in accordance with example embodiments of the disclosure.

Example embodiments of this disclosure describe methods, apparatuses, computer-readable media, and system(s) that may allow for rendering glyphs based on stored textures (e.g., texture atlas or texture cache) without loss of quality at subpixel scales.

For example, example embodiments of the disclosure may include systems and methods in which a subpixel alignment offset is determined for a glyph to be displayed and, based on the subpixel alignment offset, one or more versions of the glyph are selected for use in displaying the glyph. In some examples, a version having a respective offset closest to the pixel offset of the glyph to be displayed maybe selected and utilized. In other examples, a plurality of versions may be selected and utilized together to generate a display version of the glyph. For example, two versions having respective subpixel alignment offsets may be blended based on the respective subpixel alignment offsets and the subpixel alignment offset of the glyph to be displayed (e.g. blended proportionally based on the difference between the respective offsets and the pixel offset of the glyph to be displayed).

In some examples, the generation of the display version of the glyphs based on one or more previously rendered versions of the glyphs may be performed for a subset of or each glyph to be displayed based on the pixel offset of the respective glyph. More particularly, a first glyph to be displayed may have a first pixel offset and a second glyph to be displayed may have a second pixel offset. As such, the respective offsets of the versions selected for the first glyph may differ from the respective offsets of the versions selected for the second glyph and the blending parameters (e.g., weights) may also differ.

In some examples, the multiple versions of the glyphs may be stored in a texture atlas and different versions may be stored in different channels of the texture atlas (e.g., at the same coordinates in the texture data but in different channels). In other cases, separate texture atlases may store glyphs of respective subpixel alignment offsets or a single texture atlas may store all versions of the glyphs at different texture coordinates within the texture data.

In some examples, the selection and blending of versions of the glyphs may be performed by a graphics pipeline. For example, a pixel shader may perform a selection and extraction of texture data for a glyph at the coordinates of the glyph and perform blending to determine the value of the pixel when displayed.

Certain implementations and embodiments of the disclosure will now be described more fully below with reference to the accompanying figures, in which various aspects are shown. However, the various aspects may be implemented in many different forms and should not be construed as limited to the implementations set forth herein. For example, while the discussion focuses on versions of glyphs stored in different image data channels of a texture atlas, the various aspects may be implemented for other texture stores, such as a texture cache. Further, while the discussion herein focuses on a graphics processor performing operations to generate glyphs for display, embodiments may vary and other devices or processors may perform these operations. It will be appreciated that the disclosure encompasses other variations of the embodiments, as described herein. Like numbers refer to like elements throughout.

FIG. 1 illustrates a schematic diagram of an example system 100 including a user interface module 102 and a graphics pipeline 104 that may render glyphs based on stored textures (e.g., a texture atlas or texture cache) without loss of quality at subpixel scales. The graphics pipeline 104 may include a subpixel alignment module 112, a texture selection and extraction module 114, and a blending module 116.

In operation, the user interface module 102 may provide a current view 108 of, for example, a user application including one or more glyphs to the graphics pipeline 104 for rendering and display to a user as display data 106. The illustrated example discussed herein focuses on the display of a current glyph 110 but, one of ordinary skill in the art would understand that other graphics operations may be performed to display the current view 108 as a whole.

The graphics pipeline 104 may receive the current view 108 and output display data 106 to a display device (not shown). More particularly, the graphics pipeline 104 may receive current view data including texture coordinates or an identifier for retrieving the current glyph 110 from a texture atlas 118 and specified screen coordinates at which the glyph is to be rendered on the display. As illustrated, the current glyph 110 may be an "S" to be rendered at the position shown in the current view 108 of FIG. 1. In some examples, the specified screen coordinates may represent a quadrilateral of screen space onto which the glyph is to be mapped (e.g., a rectangular space on the screen onto which the glyph is mapped).

Upon receiving the current view 108, the graphics pipeline 104 may begin to render pixel data based on the current view 108. When the graphics pipeline 104 reaches a pixel of the current glyph (e.g., or another glyph), the graphics pipeline 104 may determine the content of the pixel corresponds to a glyph from a texture atlas 118.

The subpixel alignment module 112 of the graphics pipeline 104 may then determine a subpixel alignment offset of the specified screen coordinates with respect to the pixels of the display. For example, the screen coordinates and/or the quadrilateral onto which the glyph is to be rendered may not align to pixels on the screen. In some examples, the glyphs, and by extension, the quadrilateral onto which the glyphs are to be rendered may be fractional widths of the pixels on the screen.

Based on the subpixel alignment offset, the texture selection and extraction module 114 may select and extract one or more versions of the glyph from the texture atlas (e.g., based on texture coordinates as shown at 126). For example, the texture atlas 118 may include multiple versions of the glyphs, each version corresponding to a subpixel alignment offset (shown as layers or channels 120-124). More particularly, each version may be suitable for rendering the glyph at the specified subpixel alignment offset. In the illustrated example, a first version of the glyph may have a corresponding first subpixel alignment offset of 0.5, a second version of the glyph may have a corresponding second subpixel alignment offset 0.0 and a third version of the glyph may have a corresponding third subpixel alignment offset −0.5. In some examples, the texture selection and extraction module 114 may select the versions with subpixel alignment offsets that are the next highest and next lowest subpixel alignment offsets of the two or more versions with respect to the subpixel alignment offset of the screen coordinates. As discussed above, the glyphs may be organized into versions of the texture atlas, with each version of the texture atlas being assigned a corresponding channel. In other cases, a texture cache or separate texture atlases may store glyphs of respective subpixel alignment offsets or a single texture atlas may store all versions of the glyphs at different texture coordinates within the texture data.

The blending module 116 may then generate a display version of the current pixel based on the selected two or more versions of the glyph and the subpixel alignment offset of the specified screen coordinates. In some examples, the blending module 116 may perform a weighted blending of the selected two or more versions of the glyph to determine a content for the pixel. For example, where the specified screen coordinates have a subpixel alignment offset of 0.25 pixels, the blending module may perform an unweighted blending (or an evenly weighted blending) between a version of the glyph with a subpixel alignment offset of 0.5 and a version of the glyph with a subpixel alignment offset of 0.0. Similarly, where the specified screen coordinates have a subpixel alignment offset of 0.166666 pixels, the blending module may perform a weighted blending between the version of the glyph with the subpixel alignment offset of 0.5 and the version of the glyph with the subpixel alignment offset of 0.0, giving double weight to the version of the glyph with the subpixel alignment offset of 0.0. Of course, examples are not limited to weighted averages between versions of glyphs. One of ordinary skill in the art would understand various other combining and/or blending techniques would be suitable in view of this disclosure.

The graphics pipeline 104 may then output display data 106 including the display version of the pixel to a display device (not shown).

Though example implementation details are discussed above, variations are possible. For example, examples are not limited to combining a plurality of versions of the glyph to determine the display data. In some examples, the texture selection and extraction module 114 may select one version (e.g., the version corresponding to a subpixel alignment offset that is the closest to the subpixel alignment offset of the specified screen coordinates) and the blending module 116 may be omitted or not utilized for some glyphs.

FIGS. 2-5 illustrate an example of the determination of display data based on one or more versions of a glyph that are associated with respective subpixel alignment offsets. More particularly, FIGS. 2-5 relate to illustrated examples of mapping the glyphs of the word "Hills" onto the pixels of a display, determining pixel values based on one or more of a plurality of versions of the glyphs with respective subpixel alignment offsets and displaying the resulting pixel values. The discussion that follows focuses on the two l's of the word, "Hills." Accordingly, the "H", "i", and "s" glyphs are faded in FIGS. 4 and 5 to reduce distraction.

Figure 2:
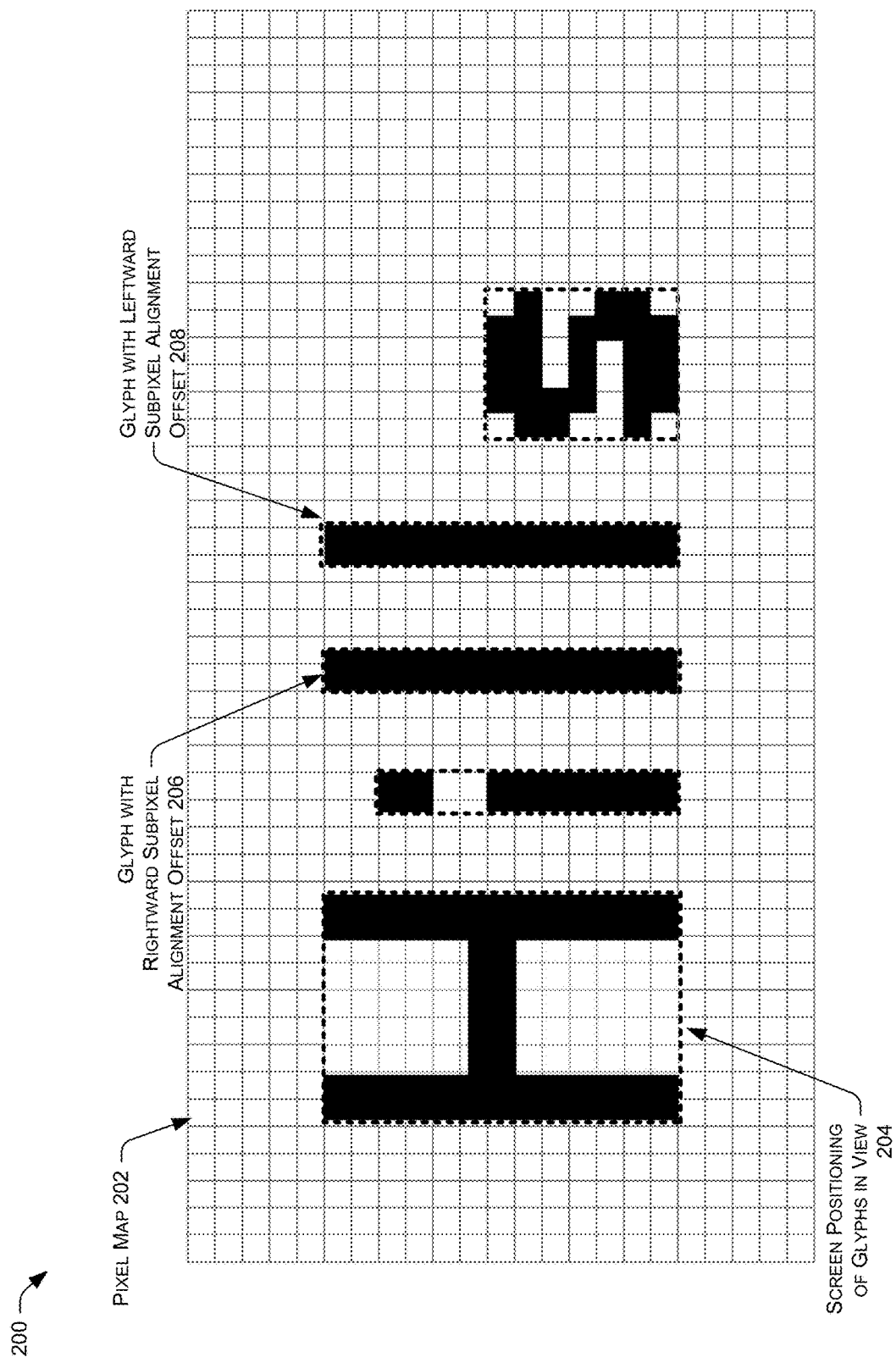
FIG. 2 illustrates an example mapping of screen coordinates for glyphs onto the pixels of a display, in accordance with example embodiments of the disclosure.

FIG. 2 illustrates example 200 including a mapping of screen coordinates for glyphs onto the pixels of a display. More particularly, FIG. 2 illustrates a mapping of screen coordinates for glyphs of the word "Hills" onto the pixel map 202 of a display. The screen coordinates may represent the positioning 204 of a quadrilateral onto which a respective glyph is to be rendered, shown in FIG. 2 as dashed lines. Herein, a rightward subpixel alignment offset may refer to a quadrilateral whose center is offset to the right of the center of the pixel or column of pixels at which the center of the quadrilateral is positioned. Similarly, a leftward subpixel alignment offset may refer to a quadrilateral whose the center is offset to the left of the center of the pixel or column of pixels in which the center of the quadrilateral is positioned. The two l's of the word, "Hills" demonstrate a rightward subpixel alignment offset and a leftward subpixel alignment offset. More particularly, the glyph 206 is an "l" with a rightward subpixel alignment offset and the glyph 208 is an "l" with a leftward subpixel alignment offset.

Figure 3:
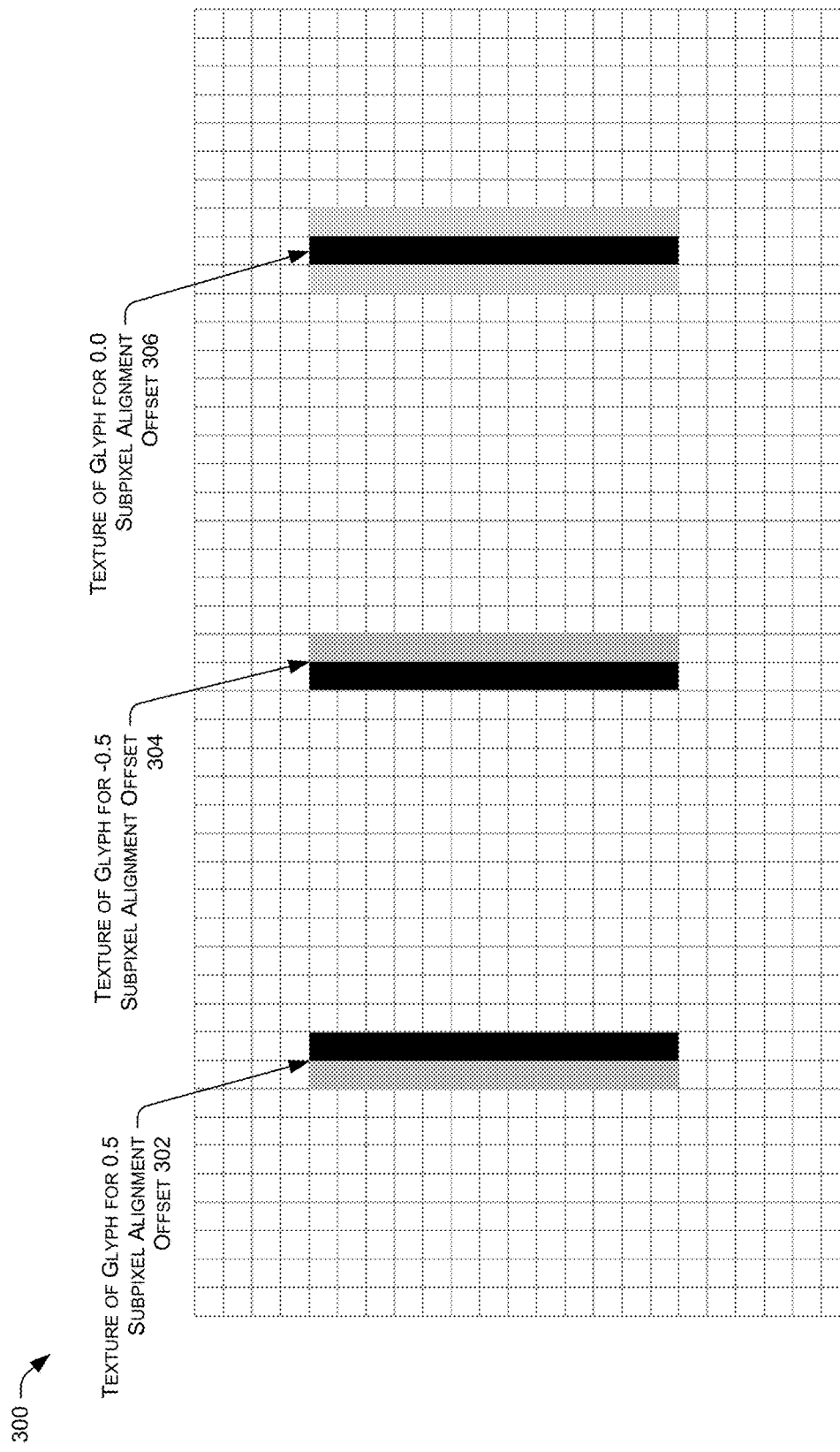
FIG. 3 illustrates an example including three versions of a texture of a glyph, each associated with a respective subpixel alignment offset, in accordance with example embodiments of the disclosure.

FIG. 3 illustrates example 300 including three versions of a texture of a glyph, each associated with a respective subpixel alignment offset. More particularly, textures 302, 304 and 306 may be associated with subpixel alignment offsets of 0.5, −0.5, and 0.0, respectively [LB1] [LB2] (e.g., where a negative subpixel alignment offset indicates a leftward subpixel alignment offset and a positive subpixel alignment offset indicates a rightward subpixel alignment offset).

As discussed above, the textures 302-306 may be ideal or adapted versions of the texture targeted to the texture's respective subpixel alignment [LB3] [LB4]. For example, when mapping to a screen offset, the closest screen pixel may be picked by rounding the value of the texture's screen coordinates. In a particular example, a 1.6 coordinate may rounded to a 2 and the offset may then be 0.4 (e.g., 2.0−1.6=0.4). Similarly, a 1.3 coordinate may be rounded to 1 and the offset may be −0.3 (e.g., 1.0−1.3=−0.3).

In some examples, a negative offset may be associated with blending between the negative (−0.5) glyph (ng) and the center (0.0) glyph (cg). On the other hand, a positive offset may be associated with blending between the positive (0.5) glyph (pg) and the center (0.0) glyph (cg).

A blending for the negative case may be determined as (|offset|/0.5) ng+(1−|offset|/0.5) cg. Applied to a particular example with a −0.3, the blending may be determined as: (|−0.3|/0.5) ng+(1−|−0.3|/0.5) cg→ 0.6 ng+0.4 cg.

A blending for the positive case may be determined as (offset/0.5) pg+(1−offset/0.5) cg. Applied to a particular example with a 0.4 offset, the blending may be determined as: (0.4/0.5) pg+(1−0.4/0.5) cg→ 0.8 pg+0.2 cg.

Some examples may also include at least some sharpening to reduce blurriness. For example, if the output from the above formulas is greater than or equal to 0.5 then the result may be multiplied by 1.4. Where the output of the formula is less than 0.5, the result may be multiplied by 0.8. These values may be chosen by trial and error and may be tuned or refined. The result of sharpening may then be clamped to 0-1.

The final value may then used to blend in the color of the text. A zero value may be completely transparent, and a 1 value may be the color of the text being rendered.

Further, the textures 302-306 may be included in the texture atlas in a variety of ways. For example, the textures 302-306 may be included at the same X and Y texture coordinates in the texture atlas, but in different channels (e.g., using the red, green and blue channels as separate grayscale images). Other examples may include utilizing entirely different texture atlases for each version or utilizing a larger texture atlas with different texture coordinates for each version of the glyph in, for example, a 2D coordinate space.

Figure 4:
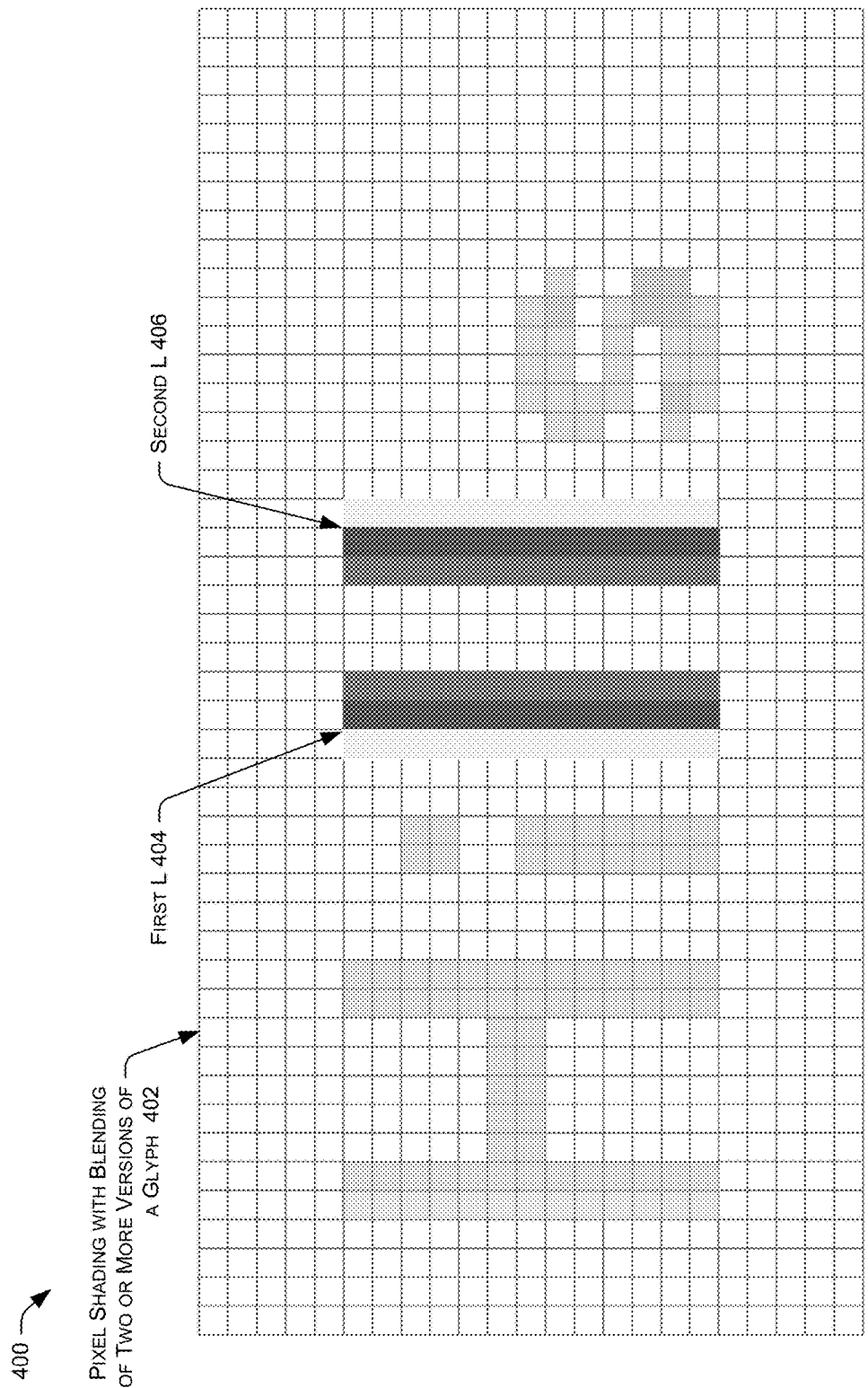
FIG. 4 illustrates an example including pixel values generated by blending a plurality of versions of a glyph, in accordance with example embodiments of the disclosure.

FIG. 4 illustrates an example 400 including pixel shading generated by blending a plurality of versions of a glyph. More particularly, FIG. 4 illustrates the result 402 of a weighted blending of the versions of the glyph with the closest greater subpixel alignment offset and the closest smaller subpixel alignment offset to the subpixel alignment offset of the quadrilateral onto which the glyph is to be rendered.

Figure 5:
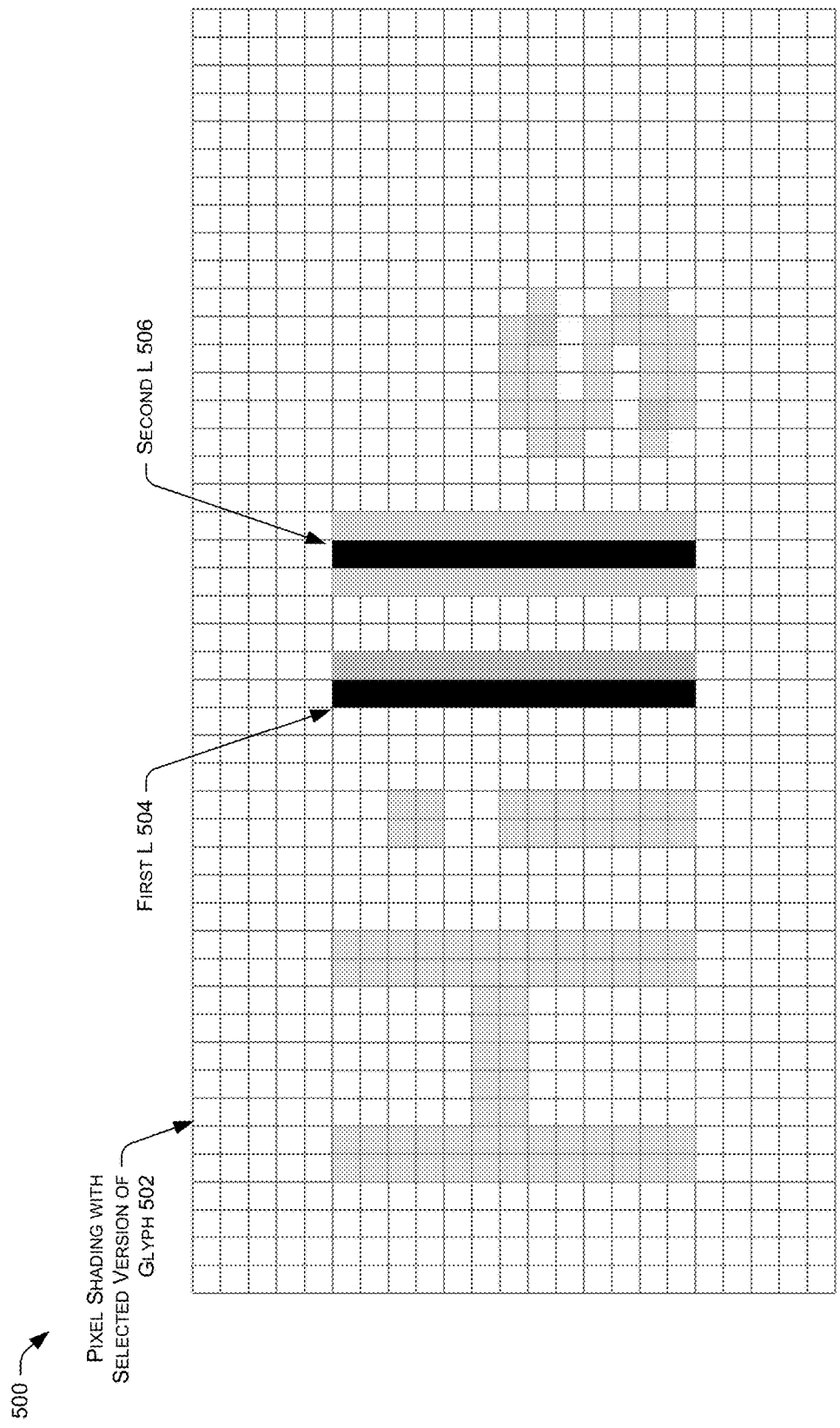
FIG. 5 illustrates an example including pixel values based on a selected version of a plurality of versions, in accordance with example embodiments of the disclosure.

Similarly, FIG. 5 illustrates an example 500 including pixel shading based on a selected version of a plurality of versions. More particularly, FIG. 5 illustrates the result 502 of a selection of the version of the glyph with the closest subpixel alignment offset to the subpixel alignment offset of the quadrilateral onto which the glyph is to be rendered.

Returning to FIG. 2, the glyph 206 is illustrated as having a rightward subpixel alignment offset closer to 0.5 than 0.0 (e.g., a 0.3 rightward subpixel alignment offset). As such, the resulting blended glyph 404 for the first "1" may be generated by weighting the texture of the glyph 304 for the subpixel alignment offset of 0.5 more heavily than the texture of the glyph 306 for the subpixel alignment offset of 0.0. For similar reasons, in FIG. 5, the texture of glyph 304 is selected and displayed as the first "1" 504 instead of the texture of glyph 306.

On the other hand, the glyph 208 is illustrated as having a leftward subpixel alignment offset closer to 0.0 than −0.5. As such, the resulting blended glyph 406 for the second "1" may be generated by weighting the texture of the glyph 306 for the subpixel alignment offset of 0.0 more heavily than the texture of the glyph 302 for the subpixel alignment offset of −0.5. For similar reasons, in FIG. 5, the texture of glyph 306 is selected and displayed as the second "1" 506 instead of the texture of glyph 302.

Figure 6:
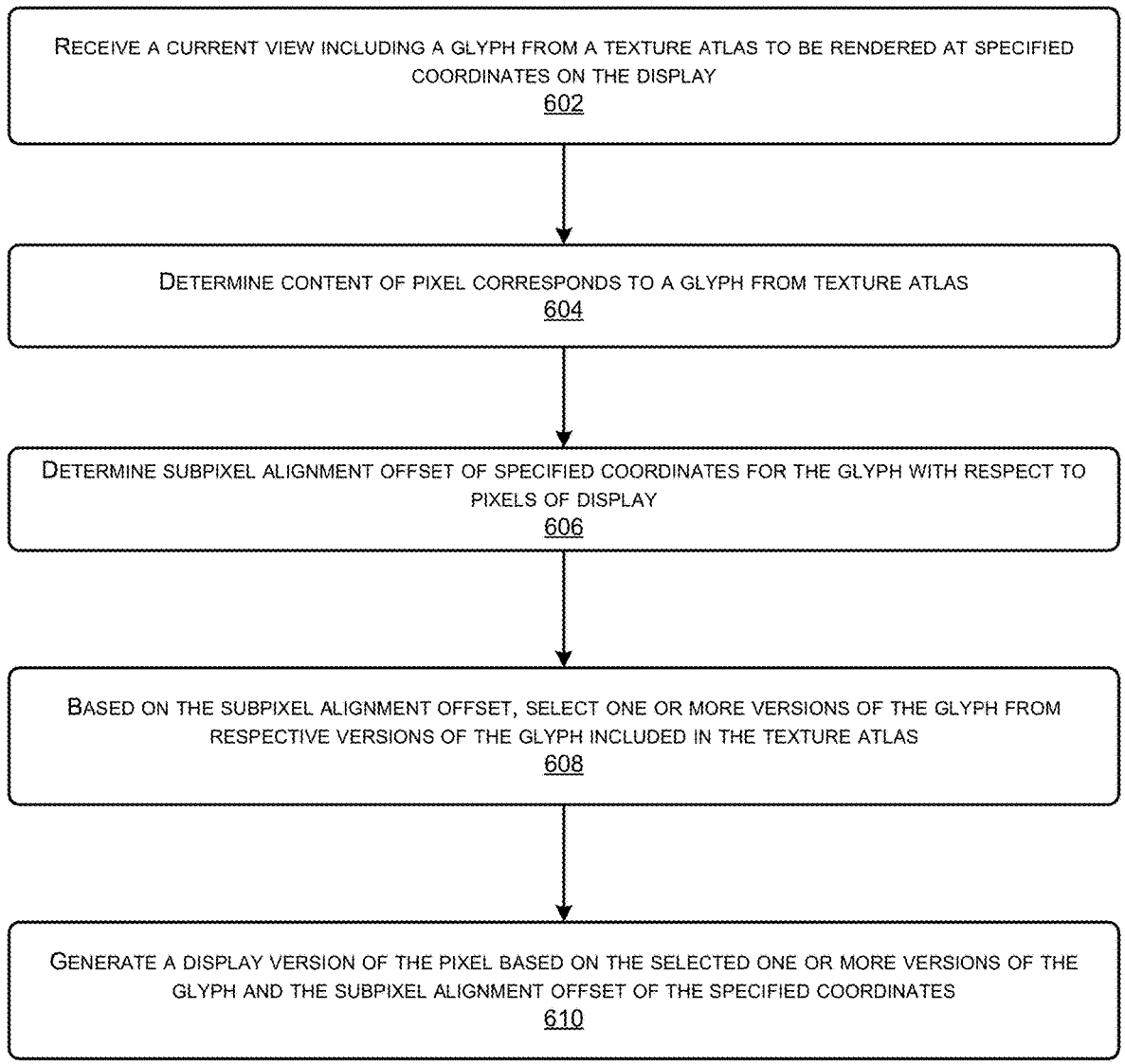
FIG. 6 illustrates a flow diagram of an example method 600 that may be performed by a graphics pipeline to determine a subpixel alignment offset for a glyph to be displayed and, based on the subpixel alignment offset, select one or more versions of the glyph for use in displaying the glyph, in accordance with example embodiments of the disclosure.

FIG. 6 illustrates a flow diagram of an example method 600 that may be performed by a graphics pipeline to determine a subpixel alignment offset for a glyph to be displayed and, based on the subpixel alignment offset, select one or more versions of the glyph for use in displaying the pixels of the glyph, in accordance with example embodiments of the disclosure. The method 600 may be performed by the system 100 as discussed above.

At block 602, the graphics pipeline may receive a current view of a user application to be displayed that includes a glyph to be rendered at specified screen coordinates on the display.

At 604, the graphics pipeline may determine the content of a pixel corresponds to a glyph from a texture atlas (e.g., the glyph is displayed in the pixel). Then, at 606, the graphics pipeline may determine a subpixel alignment offset of the specified screen coordinates for the glyph with respect to pixels of display At 608, based on the subpixel alignment offset, the graphics pipeline may select one or more versions of the glyph from respective versions of the glyph included in a texture atlas. In some examples, each version of the glyph may have a corresponding subpixel alignment offset.

Then, at 610, the graphics pipeline may generate a display version of the pixel based on the selected one or more versions of the glyph, the subpixel alignment offset of the specified screen coordinates and/or the corresponding subpixel alignment offsets of the selected versions of the glyph.

It should be noted that some of the operations of method 600 may be performed out of the order presented, with additional elements, and/or without some elements. Some of the operations of method 600 may further take place substantially concurrently and, therefore, may conclude in an order different from the order of operations shown above. Further, implementations are not limited to the details of the above examples and variations are possible.

FIG. 7 illustrates a block diagram of an example system 700 including one or more computing device(s) 702 that may determine a subpixel alignment offset for a glyph to be displayed and, based on the subpixel alignment offset, select one or more versions of the glyph for use in displaying the glyph, in accordance with example embodiments of the disclosure. The computing device(s) 702 may include one or more processor(s) 704, one or more input/output (I/O) interface(s) 706, one or more network interface(s) 708, one or more storage interface(s) 710, and computer-readable media 712.

In some implementations, the processors(s) 704 may include a central processing unit (CPU), a graphics processing unit (GPU) (e.g., graphics pipeline 104), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 704 may possess its own local memory, which also may store program modules, program data, and/or one or more operating system(s). The one or more processor(s) 704 may include one or more cores.

The one or more input/output (I/O) interface(s) 706 may enable a user to interact with the user interface module 102

(e.g., to provide input to and receive output from a user application operating on the system 700). The I/O interface(s) 706 may include a combination of hardware, software, and/or firmware and may include software drivers for enabling the operation of any variety of I/O device(s) integrated on the system 100 or with which the system 100 interacts, such as displays, microphones, speakers, cameras, switches, and any other variety of sensors, or the like.

The network interface(s) 708 may enable the system(s) 100 to communicate via the one or more network(s). The network interface(s) 708 may include a combination of hardware, software, and/or firmware and may include software drivers for enabling any variety of protocol-based communications, and any variety of wireline and/or wireless ports/antennas. For example, the network interface(s) 708 may comprise one or more of a cellular radio, a wireless (e.g., IEEE 706.1x-based) interface, a Bluetooth® interface, and the like. In some embodiments, the network interface(s) 708 may include radio frequency (RF) circuitry that allows the system(s) 100 to transition between various standards. The network interface(s) 708 may further enable the system(s) 100 to communicate over circuit-switch domains and/or packet-switch domains.

The storage interface(s) 710 may enable the processor(s) 704 to interface and exchange data with the computer-readable media 712, as well as any storage device(s) external to the system(s) 100, such as the user interface module block 102, the subpixel alignment module 112, the texture selection and extraction module 114, and the blending module 116.

The computer-readable media 712 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 712 may be implemented as computer-readable storage media (CRSM), which may be any available physical media accessible by the processor(s) 704 to execute instructions stored on the computer readable media 712. In one basic implementation, CRSM may include RAM and Flash memory. In other implementations, CRSM may include, but is not limited to, ROM, EEPROM, or any other tangible medium which can be used to store the desired information and which can be accessed by the processor(s) 704. The computer-readable media 712 may have an operating system (OS) and/or a variety of suitable applications stored thereon. The OS, when executed by the processor(s) 704 may enable management of hardware and/or software resources of the system(s) 100.

Several functional blocks having instruction, data stores, and so forth may be stored within the computer-readable media 712 and configured to execute on the processor(s) 704. The computer readable media 712 may have stored thereon the user interface module block 102, the subpixel alignment module 112, the texture selection and extraction module 114, and the blending module 116. It will be appreciated that each of the functional blocks may have instructions stored thereon that when executed by the processor(s) 704 may enable various functions pertaining to the operations of the system(s) 100.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
one or more processors; and
one or more computer-readable media storing computer-executable instructions that, when executed by the one or more processors, cause the one or more processors to:
receive a view including a glyph to be rendered at specified screen coordinates on a display;
determine a content of a pixel corresponds to the glyph;
determine a subpixel alignment offset of the specified screen coordinates for the glyph with respect to the pixels of the display;
based on the subpixel alignment offset, select one or more versions of the glyph from a plurality of versions of the glyph, a first version of the glyph of the plurality of versions of the glyph having a corresponding first subpixel alignment offset and a second version of the glyph of the plurality of versions of the glyph having a corresponding second subpixel alignment offset; and
generate a display version of the pixel based on the selected one or more versions of the glyph and the subpixel alignment offset of the specified screen coordinates.

2. The system of claim 1, wherein generating the display version comprises blending two or more of the plurality of versions of the glyph based on the subpixel alignment offset of the specified screen coordinates.

3. The system of claim 2, wherein the blending is proportionally based on differences between the subpixel alignment offset of the specified screen coordinates for the glyph, the first subpixel alignment offset and the second subpixel alignment offset.

4. The system of claim 2, the computer-executable instructions, when executed by the one or more processors, further causing the one or more processors to:
determine another content of another pixel corresponds to another glyph;
determine another subpixel alignment offset of another specified screen coordinates for the other glyph with respect to the other pixel of the display;
based on the other subpixel alignment offset, select one or more other versions of the other glyph from a plurality of other versions of the other glyph, a third version of the other glyph of the plurality of other versions of the other glyph having a corresponding third subpixel alignment offset and a fourth version of the other glyph of the plurality of other versions of the glyph having a corresponding fourth subpixel alignment offset; and
generate another display version of the other pixel based on the selected one or more other versions of the other glyph and the other subpixel alignment offset of the other specified screen coordinates.

5. The system of claim 4, wherein the plurality of versions of the glyph and the other plurality of versions of the other glyph are included in a texture atlas.

6. The system of claim 1, wherein the plurality of versions of the glyph are included in a texture atlas, wherein a set of texture coordinates to retrieve the plurality of versions of the glyph from the texture atlas are shared by at least two of the plurality of versions of the glyph that stored in different image data channels of the texture atlas.

7. A computer-implemented method comprising:
determining a content of a pixel of a display corresponds to a glyph to be rendered at specified screen coordinates on the display;
determining a subpixel alignment offset of the specified screen coordinates for the glyph with respect to the pixels of the display;
based on the subpixel alignment offset of the specified screen coordinates and respective subpixel alignment offsets of a plurality of versions of the glyph, selecting one or more of the plurality of versions of the glyph; and
generating a display version of the pixel based on the selected one or more versions of the glyph and the subpixel alignment offset of the specified screen coordinates.

8. The computer-implemented method of claim 7, wherein generating the display version comprises blending two or more of the plurality of versions of the glyph based on the subpixel alignment offset of the specified screen coordinates.

9. The computer-implemented method of claim 8, wherein the blending is proportionally based on a difference between the subpixel alignment offset of the specified screen coordinates for the glyph and a first subpixel alignment offset of a first version of the glyph of the plurality of versions of the glyph and a difference between a second subpixel alignment offset of a second version of the glyph of the plurality of versions of the glyph and the specified screen coordinates for the glyph.

10. The computer-implemented method of claim 7, further comprising:
determining another content of another pixel corresponds to another glyph;
determining another subpixel alignment offset of another specified screen coordinates for the other glyph with respect to the other pixel of the display;
based on the other subpixel alignment offset, selecting one or more other versions of the other glyph from a plurality of other versions of the other glyph, a third version of the other glyph of the plurality of other versions of the other glyph having a corresponding third subpixel alignment offset and a fourth version of the other glyph of the plurality of other versions of the glyph having a corresponding fourth subpixel alignment offset; and
generating another display version of the other pixel based on the selected one or more other versions of the other glyph and the other subpixel alignment offset of the other specified screen coordinates.

11. The computer-implemented method of claim 10, wherein the plurality of versions of the glyph and the other plurality of versions of the other glyph are included in a texture atlas.

12. The computer-implemented method of claim 11, wherein the plurality of versions of the glyph are included in a texture atlas, wherein a set of texture coordinates to retrieve the plurality of versions of the glyph from the texture atlas are shared by at least two of the plurality of versions of the glyph that stored in different image data channels of the texture atlas.

13. The computer-implemented method of claim 7, further comprising:
  determining another content of another pixel of the display corresponds to the glyph, the pixel and the other pixel corresponding at least partially to a same portion of the glyph;
  determining another subpixel alignment offset of another specified screen coordinates for the glyph with respect to the other pixel of the display;
  based on the other subpixel alignment offset, selecting one or more other versions of the glyph from the plurality of versions of the glyph; and
  generating another display version of the other pixel based on the selected one or more other versions of the glyph and the other subpixel alignment offset of the other specified screen coordinates.

14. The computer-implemented method of claim 13, wherein the display version of the pixel and the other display version of the other pixel differ.

15. A system comprising:
  one or more processors; and
  one or more computer-readable media storing computer-executable instructions that, when executed by the one or more processors, cause the one or more processors to perform operations comprising:
    determining a content of a pixel of a display corresponds to a glyph to be rendered at specified screen coordinates on the display;
    determining a subpixel alignment offset of the specified screen coordinates for the glyph with respect to the pixels of the display;
    based on the subpixel alignment offset of the specified screen coordinates and respective subpixel alignment offsets of a plurality of versions of the glyph, selecting one or more of the plurality of versions of the glyph; and
    generating a display version of the pixel based on the selected one or more versions of the glyph and the subpixel alignment offset of the specified screen coordinates.

16. The system of claim 15, wherein generating the display version comprises blending two or more of the plurality of versions of the glyph based on the subpixel alignment offset of the specified screen coordinates.

17. The system of claim 16, wherein the blending is proportionally based on a difference between the subpixel alignment offset of the specified screen coordinates for the glyph and a first subpixel alignment offset of a first version of the glyph of the plurality of versions of the glyph and a difference between a second subpixel alignment offset of a second version of the glyph of the plurality of versions of the glyph and the specified screen coordinates for the glyph.

18. The system of claim 15, the operations further comprising:
  determining another content of another pixel corresponds to another glyph;
  determining another subpixel alignment offset of another specified screen coordinates for the other glyph with respect to the other pixel of the display;
  based on the other subpixel alignment offset, selecting one or more other versions of the other glyph from a plurality of other versions of the other glyph, a third version of the other glyph of the plurality of other versions of the other glyph having a corresponding third subpixel alignment offset and a fourth version of the other glyph of the plurality of other versions of the glyph having a corresponding fourth subpixel alignment offset; and
  generating another display version of the other pixel based on the selected one or more other versions of the other glyph and the other subpixel alignment offset of the other specified screen coordinates.

19. The system of claim 18, wherein the plurality of versions of the glyph and the other plurality of versions of the other glyph are included in a texture atlas and the plurality of versions of the glyph are included in a texture atlas, wherein a set of texture coordinates to retrieve the plurality of versions of the glyph from the texture atlas are shared by at least two of the plurality of versions of the glyph that stored in different image data channels of the texture atlas.

20. The system of claim 15, the operations further comprising:
  determining another content of another pixel of the display corresponds to the glyph, the pixel and the other pixel corresponding at least partially to a same portion of the glyph;
  determining another subpixel alignment offset of another specified screen coordinates for the glyph with respect to the other pixel of the display;
  based on the other subpixel alignment offset, selecting one or more other versions of the glyph from the plurality of versions of the glyph; and
  generating another display version of the other pixel based on the selected one or more other versions of the glyph and the other subpixel alignment offset of the other specified screen coordinates, wherein the display version of the pixel and the other display version of the other pixel differ.

* * * * *